N. GUTHRIE & C. L. JOHNSON.
TIRE FOR VEHICLE WHEELS.
APPLICATION FILED JULY 29, 1909.
978,019.
Patented Dec. 6, 1910.
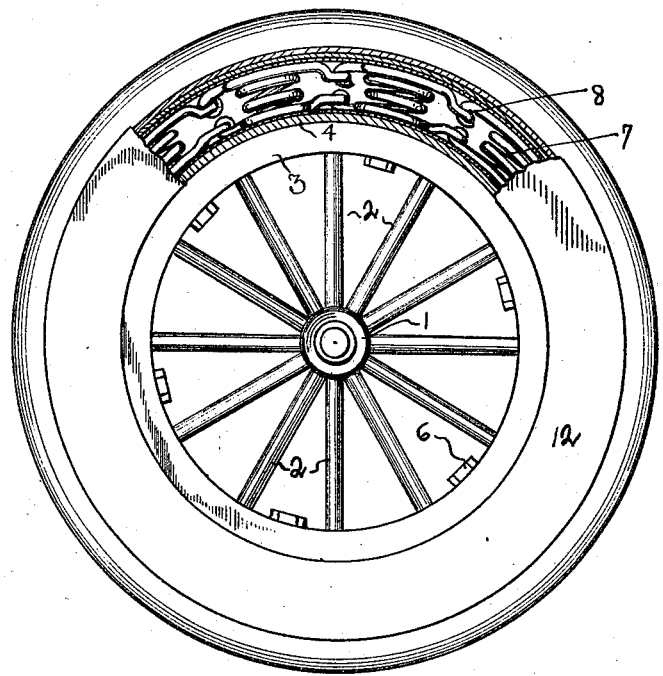
Fig.1
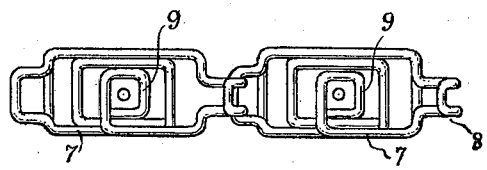
Fig.2
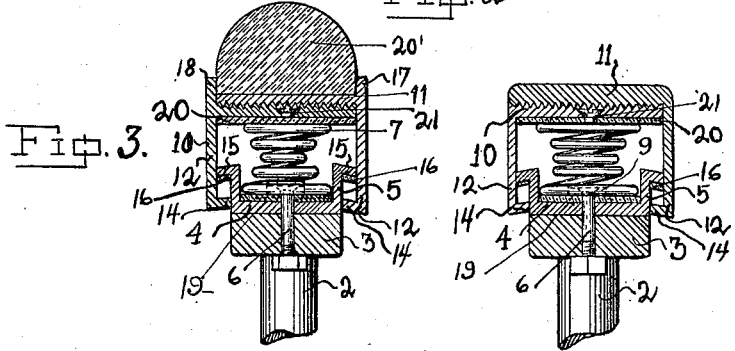
WITNESSES
E. C. Davis Jr.
L. E. Noack
INVENTORS
Nehemiah Guthrie
Callender L. Johnson
BY
Schley & Davis
ATTORNEY

UNITED STATES PATENT OFFICE.

NEHEMIAH GUTHRIE AND CALLENDER L. JOHNSON, OF DALLAS, TEXAS.

TIRE FOR VEHICLE-WHEELS.

978,019.  Specification of Letters Patent. Patented Dec. 6, 1910.

Application filed July 29, 1909. Serial No. 510,343.

*To all whom it may concern:*

Be it known that we, NEHEMIAH GUTHRIE and CALLENDER L. JOHNSON, citizens of the United States, residing at Dallas, in the county of Dallas and State of Texas, have invented a new and useful Improvement in Tires for Vehicle-Wheels, of which the following is a specification.

Our invention relates to new and useful improvements in a spring tire for vehicle wheels.

The object of our invention is to provide a vehicle tire which will do away with the use of pneumatic tires and one which on account of its peculiar construction will be as resilient as pneumatic tires.

A further object of our invention is to provide a tire which will absorb a portion of the shocks which are now communicated to the springs of a vehicle.

A still further object of our invention is to provide a tire which will carry springs adapted to act as a cushion and one which is so arranged that access may be had to its several working parts at any time. And finally the object of our invention is to provide a device of the character described which will be simple, strong, durable, efficient and comparatively, inexpensive to construct and one which can be made in many different sizes to meet the demands of the public without weakening its construction or decreasing its efficiency.

With the above and other objects in view our invention has relation to certain novel features of construction and operation an example of which is described in the following specification and illustrated in the accompanying drawing, wherein:

Figure 1 is a side elevation of our tire on a wheel with a portion of the casing broken away to show the springs, Fig. 2 is a plan view of a spring used in our tire, Fig. 3 is a section of the rim of our tire showing an end elevation of one of our springs. Fig. 4 is a section of the rim of a modified form of our invention using a steel tire.

In the drawings the numeral 1 designates the hub of our wheel while the numeral 2 designates the spokes which are arranged to support a felly 3 in the usual manner. A rim 4 carrying upwardly extending flanges 5 is held on the felly by bolts 6 best shown in Figs. 3 and 4 which extend through the rim and felly. The springs 7 which lie between the flanges 5 and are linked together at 8 and held in position by the heads of the bolts 6 which pass through a ring 9 in the lowest extremity of the spring 7. This spring is protected by a casing formed in sections, the female member 11 carrying threads adapted to engage with threads carried by the male member 10 while both of the members carry flanges 12. Inwardly projecting flanges 14 are arranged on the flanges 12 so that after the two sections are screwed together they will extend over and engage under flanges 15 carried on the upper edge of the flanges 5. A suitable packing 16 may be placed between the flanges 14 and 15 to prevent mud and sand entering the casing and interfering with the free action of the spring. Flanges 17 and 18 carried by the casing members form a rim adapted to hold a rubber tire in place when the casing members are screwed together. These flanges are left off in our modified form shown in Fig. 4 but the casing member 11 is made heavier so that it may act as a steel tire.

Particular attention is called to the spring 7 which unlike other springs, is oblong and the rings at the center are a great deal smaller than those at its top and bottom allowing the spring to be tilted and making it better adapted to withstand any side stress. This spring is held down against a suitable packing 19 at its bottom by the head of the bolts 6 while the upper end of the spring is held against a similar packing strip 20 by a bolt 21 which is counter sunk in the male member 10. The springs being wound so that they are double acting and being fastened to both the top and bottom of casing, the strain is divided there being no more strain of those springs on the bottom of the wheel than there is on those at the top. As all the springs are connected together at 8 it is obvious that the strain will be communicated to all the springs simultaneously and any sudden shock will be absorbed by the tire without the rebound common to other springs because one spring will always be acting against the other.

What we claim is:

In a resilient wheel, a circumferential rim having radial flanges provided with outwardly extending projections, opposed parallel casing members embracing the projections of the flanges and provided at their inner edges with flanges projecting substantially parallel to the projections of the first named flanges, a packing interposed between the projections and the flanges of the members, the casing members being movable with relation to the rim, an annular lateral flange on one of the casing members directed toward the other member and provided with circumferential peripheral screw threads, a second annular lateral flange on the other member and having circumferential and internal peripheral screw threads engaging the screw threads of the first lateral flange whereby the casing members are fastened together, and springs confined between the lateral flanges and the rim whereby the casing members are resiliently supported on the rim.

In testimony whereof we have signed our names in the presence of two witnesses.

NEHEMIAH GUTHRIE.
CALLENDER L. JOHNSON.

Witnesses:
L. E. NOACK,
E. C. DAVIS.